US010393486B2

(12) United States Patent
Havens et al.

(10) Patent No.: US 10,393,486 B2
(45) Date of Patent: Aug. 27, 2019

(54) BIODEGRADABLE SHOTGUN GAS SEALING WAD

(71) Applicant: College of William & Mary, Williamsburg, VA (US)

(72) Inventors: Kirk J. Havens, Plainview, VA (US); David M. Stanhope, Williamsburg, VA (US); Kory T. Angstadt, Gloucester, VA (US); Jason P. McDevitt, Williamsburg, VA (US)

(73) Assignee: College of William & Mary, Williamsburg, VA (US)

( * ) Notice: Subject to any disclaimer, the term of this patent is extended or adjusted under 35 U.S.C. 154(b) by 68 days.

(21) Appl. No.: 15/926,452

(22) Filed: Mar. 20, 2018

(65) Prior Publication Data
US 2018/0274889 A1    Sep. 27, 2018

Related U.S. Application Data

(60) Provisional application No. 62/474,152, filed on Mar. 21, 2017, provisional application No. 62/474,157, filed on Mar. 21, 2017.

(51) Int. Cl.
*F42B 7/08* (2006.01)
*F42B 33/12* (2006.01)
(Continued)

(52) U.S. Cl.
CPC ...... *F42B 7/08* (2013.01); *C08J 5/00* (2013.01); *C08L 67/02* (2013.01); *C08L 67/04* (2013.01);
(Continued)

(58) Field of Classification Search
CPC .... F42B 7/02; F42B 7/08; F42B 33/00; F42B 33/001; F42B 33/02; F42B 33/12;
(Continued)

(56) References Cited

U.S. PATENT DOCUMENTS

| 2,582,124 A | 1/1952 | Holmes |
| 3,074,344 A | 1/1963 | Devaux |

(Continued)

FOREIGN PATENT DOCUMENTS

| FR | 3010410 | 3/2015 | |
| FR | 3010410 A1 * | 3/2015 | ............ F42B 12/745 |

(Continued)

OTHER PUBLICATIONS

Machine translation of FR 3010 410 A1; Mar. 2015.*
(Continued)

*Primary Examiner* — James S Bergin
(74) *Attorney, Agent, or Firm* — Knobbe, Martens, Olson & Bear, LLP

(57) ABSTRACT

Herein we describe embodiments of a biodegradable wad having a gas sealing function, as well as methods for their use. In some embodiments, the biodegradable wad comprises at least 50% by weight of a poly(butylene succinate co-adipate) polymer. In some embodiments, the biodegradable wad comprises at least two biodegradable polymers, wherein a first biodegradable polymer comprises a polybutylene succinate adipate polymer and a second biodegradable polymer comprises a polyhydroxyalkanoate polymer. Plastic debris has a negative economic and ecological impact, and thus it is advantageous to use implements that will degrade into environmentally benign compounds. Incorporating a biodegradable wad into shotgun shells provides an effective, economical solution, provided cost is acceptable and performance is not compromised. Suitable shotgun shells utilizing biodegradable shotgun wads and methods are described herein.

30 Claims, 7 Drawing Sheets

(51) Int. Cl.
*F42B 33/02* (2006.01)
*C08J 5/00* (2006.01)
*C08L 67/02* (2006.01)
*C08L 67/04* (2006.01)

(52) U.S. Cl.
CPC .............. *F42B 33/02* (2013.01); *F42B 33/12* (2013.01); *C08J 2300/16* (2013.01); *C08J 2323/06* (2013.01); *C08J 2367/02* (2013.01); *C08J 2367/04* (2013.01); *C08L 2201/06* (2013.01); *C08L 2205/02* (2013.01)

(58) Field of Classification Search
CPC ........ F42B 33/004; C08L 67/02; C08L 67/04; C08L 2201/06; C08L 2205/02
USPC .......................................... 102/532, 448–463
See application file for complete search history.

(56) References Cited

U.S. PATENT DOCUMENTS

| | | | |
|---|---|---|---|
| 3,093,073 A | 6/1963 | Lockwood et al. | |
| 3,402,664 A | 9/1968 | Cramer | |
| 3,974,770 A | 8/1976 | Clark | |
| 4,004,522 A | 1/1977 | Furniss et al. | |
| 5,263,417 A | 11/1993 | Godfrey-Phllips | |
| 5,859,090 A | 1/1999 | Shahid et al. | |
| 6,283,037 B1 | 9/2001 | Sclafani | |
| 7,810,432 B2 | 10/2010 | Stevens | |
| 8,418,620 B2 | 4/2013 | Frank | |
| 9,222,761 B2 | 12/2015 | DeJong | |
| 9,528,800 B2 | 12/2016 | Havens et al. | |
| 10,139,206 B2* | 11/2018 | Havens .................. | C08L 67/02 |
| 2004/0099172 A1 | 5/2004 | Schikora | |
| 2008/0223245 A1 | 9/2008 | Stevens et al. | |
| 2012/0144722 A1 | 6/2012 | Havens et al. | |
| 2014/0366765 A1 | 12/2014 | Havens et al. | |
| 2016/0010963 A1 | 1/2016 | Moreno | |
| 2016/0216067 A1 | 7/2016 | Jackson | |
| 2016/0334197 A1 | 11/2016 | Pedretti | |
| 2017/0160062 A1 | 6/2017 | Havens et al. | |
| 2019/0093998 A1* | 3/2019 | Havens .................. | C08L 67/02 |

FOREIGN PATENT DOCUMENTS

| | | |
|---|---|---|
| GB | 2367606 | 4/2002 |
| GB | 2496180 | 5/2013 |
| WO | WO 2014/201278 | 12/2014 |
| WO | WO 2015/033081 | 3/2015 |
| WO | WO 2016/174276 | 11/2016 |

OTHER PUBLICATIONS

U.S. Appl. No. 15/926,523, filed Mar. 20, 2018, Havens et al.
Search Report and Written Opinion for application No. PCT/US14/42169 dated Dec. 19, 2004.
PCT/US14/421169, PCT Invitation to pay additional fees and, where applicable, protest fee dated Oct. 17, 2014 (2 pages).
Search Report and Written Opinion for application No. PCT/US18/23429 dated Jun. 8, 2018.
Search Report and Written Opinion for application No. PCT/US18/23402 dated Jun. 11, 2018.
Dr.Chris Schwier, Metabolix, Inc., "Polyhydroxyalkanoates (PHA) Bioplastic Packaging Materials", Strategic Environmental Research and Development Program (Year: 2010).

* cited by examiner

BIODEGRADABLE SHOTGUN GAS SEALING WAD

CROSS-REFERENCE TO RELATED APPLICATIONS

The present application claims priority under 35 U.S.C. § 119(e) to (i) U.S. Provisional Patent Application No. 62/474,152, filed Mar. 21, 2017, and (ii) U.S. Provisional Patent Application No. 62/474,157, filed Mar. 21, 2017. The entire disclosure of these applications is incorporated by reference herein.

STATEMENT REGARDING FEDERALLY SPONSORED RESEARCH OR DEVELOPMENT

Not Applicable

BACKGROUND

Field

The field relates to degradable wads associated with shotgun shells often used in and around aquatic environments.

Description of the Related Art

Shotguns are one of the most widely produced firearms worldwide. For example, the number of new shotguns manufactured in the United States was close to one million in 2011. Moreover, the annual production of shotgun shells is in the billions. Every shotgun shell that is fired will discharge a wad (i.e., a "spent" wad) at a substantial distance from the sportsman. This distance prevents facile recovery and the ejected wad subsequently becomes pollution. Typically, the wad is composed of plastic that does not biodegrade, meaning the pollution is long-lasting.

The wads have multiple purposes in shotgun ammunition: (1) they separate the powder from the shot; (2) they expand to form a gas seal that retains the gas blast behind the shot as it travels down the barrel, efficiently maintaining velocity; (3) they provide protection to the barrel (particularly important when non-lead shot is used); (4) they can provide a cushioning effect to soften recoil, and (5) they can provide improved shot patterns and minimize distortion of the shot.

The effect of non-biodegradable plastic debris is significant. Abandoned shotgun wads can present safety, nuisance, and environmental problems on land and in freshwater, estuarine, and marine waters. When a waterfowl hunter fires a shotgun armed with a shell containing a non-biodegradable plastic wad, the wad is shot out of the gun and often flies into the adjoining water. The quantity of abandoned shotgun wads in the nation's waters is unknown; however, a shotgun wad is discharged with every shot fired, and often abandoned. Target shooters (e.g., skeet, trap) often fire many shots in rapid succession, leaving a slew of plastic wads. Due to the range of shotguns and the locations in which they are used, there is often no practical way for sportsmen to recover spent shotgun wads.

Abandoned wads enter the food chain as non-biodegradable plastic debris. Plastic wads are reported as one of the most common debris items collected during beach cleanups (NOAA. 2012. Guidebook to community beach cleanups). The buoyancy of many plastics causes the debris to float; therefore, plastic wads that do not wash ashore tend to float on the water's surface. The floating wads can be mistaken for food by waterfowl and other marine species. For example, wads have been found in the stomach contents of ocean-foraging birds including the albatross (The Conservation Report. 2009). The consumption of plastic can lead to reduced fitness of aquatic species.

Abandoned wads also damage sensitive habitats. Over time, non-degradable plastic wads can break apart, causing massive amounts of non-degradable microplastics to enter the aquatic ecosystem. Currents can deposit the floating wads on distant river banks and coasts, thereby impacting all marine habitats, even habitats where hunting is prohibited. Furthermore, non-degradable plastic components can remain largely intact even after spending years afloat, before fracturing into smaller microplastics. The microplastics can adsorb organic toxins, and do not readily break down into compounds that can be assimilated into the natural carbon cycle.

Due in part to their low cost and versatility, production of plastics is likely to continue to increase. Worldwide commodity plastic production has increased by roughly 9% annually since 1950, with over 300 million tons produced annually in 2016. Approximately 60% of all the plastic ever made is accumulating in landfills and the natural environment (Geyer, R, et al., "Production, use, and fate of all plastics ever made", Science Advances, 19 Jul. 2017, Vol. 3(7): e1700782). It is likely that the increase in plastic production mirrors the increase in aquatic debris. Additionally, around half the global population resides within 100 kilometers of a coastline. With coastal populations increasing, the amount of aquatic and land-based plastic debris is likely to rise.

SUMMARY

The present disclosure relates to shotgun wads utilizing a polybutylene succinate adipate polymer (PBSA), also referred to as poly(butylene succinate co-adipate). The wads described herein do not adversely impact the accuracy of the shot. More specifically, the present disclosure contemplates a shotgun wad having a gas sealing function that comprises PBSA, as well as shotgun shells comprising a gas seal wad comprising PBSA, as well as methods for loading and shooting shotgun shells with PBSA gas seal wads.

The shotgun gas seal wad comprising PBSA can take any wad form, so long as it comprises a gas seal wad, also referred to herein as a gas sealing wad, also referred to as a powder wad. It separates the powder from the shot and serves as a gas seal component, and optionally can also include other components and functionalities such as one or more of cushioning, spacing, and protecting the barrel. A gas seal wad is a shotgun wad that performs the function of expanding to form a gas seal which effectively contains the rapidly expanding gas generated upon firing, thereby pushing the wad and shot down the barrel without letting a significant amount of gas blow through or around the wad. Also, the gas seal wad separates the shot from the powder. The gas seal wad is in direct contact with the powder, and thus is sometimes called a powder wad. There are powder wads in the art, in particular biodegradable disk-style powder wads made from materials like wool felt and fiber, that perform the function of separating the shot from the powder, but do not perform the gas sealing role as effectively as PBSA powder wads described herein.

A shotgun gas sealing wad comprising PBSA can be a single-piece wad that is used in a shotgun shell without any additional wads. In such embodiments, the gas sealing wad additionally includes a shot cup portion that can contain shot within a shotshell. Alternatively, in other embodiments, a PBSA gas sealing wad is combined with additional, independent wads, e.g., one or more of a cushion wad, a shot cup (also known as a shot wad), an overshot wad, and a filler wad.

The shotgun gas seal wads described herein comprise PBSA, and can comprise by weight at least 10% PBSA, at least 20%, at least 30%, at least 40%, at least 50%, at least 60%, at least 70%, at least 80%, at least 90%, or at least 95% PBSA. In preferred embodiments, the gas seal wad comprises at least 60% by weight PBSA. In some embodiments, other biodegradable polymers are also incorporated into the shotgun gas seal wads. For example, polyhydroxyalkanoate (PHA) can be included.

The shotgun gas seal wads described herein comprise a biodegradable polymer. The shotgun gas seal wad can comply with one or more definitions of biodegradable. The ASTM D6400 is entitled Standard Specification for Labeling of Plastics Designed to be Aerobically Composted in Municipal or Industrial Facilities. See ASTM Standard D6400, 2004, "Standard Specification for Compostable Plastics," ASTM International, West Conshohocken, Pa., 2004, DOI: 10.1520/D6400-04, www.astm.org, wherein the ASTM Standard D6400, 2004 is incorporated by reference in its entirety. The ASTM D6400 identifies three governing provisions that must be met: the product must physically degrade such that the product is not "readily distinguishable" from the surrounding compost, the product must be consumed by microorganisms at a rate comparable to other known compostable materials, and the product cannot adversely impact the ability of the compost to support plants. This specification covers plastics and products made from plastics that are designed to be composted in municipal and industrial aerobic composting facilities.

In some embodiments, a material is biodegradable if it undergoes degradation by biological processes during composting to yield $CO_2$, water, inorganic compounds, and biomass at a rate consistent with other known compostable materials. In some embodiments, a material is biodegradable if it leaves no visible, distinguishable, or toxic residue. Bioplastics can be defined by where the material comes from or its origin. Bioplastics can be plant-derived such as from corn, sugar, or starch, whereas most traditional plastics are petroleum-based. Bioplastics can be defined by a time frame of degradation, wherein bioplastics degrade significantly faster than the rate of traditional plastics. Biodegradation can be defined by a change of material or degradation by naturally occurring microorganisms over a period of time. Degradation can be defined by a deleterious change in the chemical structure, physical properties, or appearance of the material. See ASTM D6400, 2004. A biodegradable material can be defined by the ability to completely break down and return to nature, i.e., decompose into elements found in nature within a reasonably short period of time such as one year after customary disposal. A biodegradable material can be defined as a material wherein all the organic carbon can be converted into biomass, water, carbon dioxide, and/or methane via the action of naturally occurring microorganisms such as bacteria and fungi, in timeframes consistent with the ambient conditions of the disposal method. See ASTM D883. The shotgun gas seal wads can be described as bio-based, biodegradable, or compostable.

PBSA, also known as poly(butylene succinate-co-adipate), is a co-polymer synthesized from succinic acid, 1,4-butanediol, and adipic acid. Relative to the polybutylene succinate (PBS), PBSA typically has a lower melting point, less tensile strength, greater elongation, and faster biodegradability. In contrast to shotgun gas seal wads comprising PBS, gas seal wads comprising PBSA have significant advantages, being less prone to brittle failure (a common problem with wads made from biodegradable plastics) and faster to biodegrade, particularly in marine environments. Given the huge numbers of plastic shotgun wads found in beach cleanups, this is a major advantage. Moreover, unlike conventional plastics used in shotgun wads, PBSA has a specific gravity of significantly greater than 1.0, meaning that PBSA wads and fragments thereof typically sink rapidly in water and thus do not tend to float, reducing their likelihood of adsorbing toxic organic pollutants in the water or being consumed, for example, by aquatic animals, including filter feeders, or birds.

In addition to PBSA, the gas sealing wads can comprise additives, including lubricants, mold release agents, impact modifiers, pigments or other colorants, other polymeric components, photodegradation enhancers, stabilizers, plasticizers, and other plastic additives.

The PBSA shotgun gas seal wads biodegrade reasonably well in most environments in which the wads might ultimately end up, including wastewater treatment facilities, soil, freshwater environments, and marine environments. PBSA gas sealing wads include a circular section that obturates when the shotgun is fired to form an efficient gas seal. Relative to other gas sealing wads that biodegrade well, the PBSA gas sealing wads provide superior gas seals, with enhanced ability to flex and seal expanding gases relative to non-plastic gas sealing wads made from materials such as wool felt, fiber, and cardboard. The PBSA gas sealing wads provide superior gas seals, thereby resulting in reducing gas blowthrough and therefore higher shot velocities. The PBSA gas sealing wads have a reduced likelihood for fracture relative to biodegradable plastic wads made from most environmentally benign formulations of biodegradable plastics such as polylactic acid (PLA), polyhydroxyalkanoates (PHA), or polybutylene succinate (PBS). Brittle biodegradable plastic formulations can be toughened, for example, by adding substantial quantities of impact modifying agents, but that would result in substantial quantities of the impact modifying agents being released into the environment, which can be undesirable from an environmental perspective.

In some embodiments, a shotgun shell is provided. The shotgun shell can include a shotgun case having a boundary defining an enclosed space and a degradable gas sealing wad confined within the enclosed space. The degradable gas sealing wad can comprise a PBSA polymer with a specific gravity greater than one. The PBSA polymer can degrade into environmentally benign components.

In some embodiments, a method of shooting a shotgun shell is provided. The method can include the step of providing a shotgun case having a boundary defining an enclosed space and a degradable gas sealing wad comprising PBSA confined within the enclosed space. The method includes the steps of inserting the shotgun case into a shotgun and firing the shotgun. The degradable wad can be discharged from the barrel of the shotgun. The method can include the step of exposing the degradable gas sealing wad to an aquatic environment after having been fired from the shotgun.

In some embodiments, a method of loading a shotgun shell is provided. The method includes the steps of providing a primed shotshell hull, sequentially adding powder, a gas sealing wad comprising PBSA, and shot to said hull, and then crimping the loaded hull, wherein the biodegradable gas sealing wad physically separates said powder from said shot and provides a gas sealing function.

In some embodiments, a shotgun shell is provided. The shotgun shell can include a shotgun case having a boundary defining an enclosed space. The shotgun shell can include shot. The shotgun shell can include powder. The shotgun shell can include a biodegradable wad confined within said enclosed space. In some embodiments, said biodegradable wad separates said shot from said powder and provides a gas sealing function. In some embodiments, said biodegradable wad comprises at least 50% by weight of a polybutylene succinate adipate polymer.

In some embodiments, wherein said biodegradable wad comprises a biodegradable polymer, and wherein said biodegradable polymer comprises at least 80% by weight of a polybutylene succinate adipate polymer. In some embodiments, said biodegradable wad comprises at least two biodegradable polymers, wherein said first biodegradable polymer comprises a polybutylene succinate adipate polymer and wherein said second biodegradable polymer comprises a polyhydroxyalkanoate polymer. In some embodiments, wherein the concentration by weight of said first biodegradable polymer to said second biodegradable polymer in said biodegradable wad is greater than four to one. In some embodiments, said biodegradable wad is a one-piece wad. In some embodiments, said one-piece wad comprises a cup portion that contains said shot within said shotgun case, and wherein said cup portion includes slits. In some embodiments, the one-piece wad is the only wad within the shotgun case. In some embodiments, said biodegradable wad is a gas sealing wad. In some embodiments, said shotgun case encloses the biodegradable wad and another wad.

In some embodiments, a method of shooting a shotgun shell is provided. The method can include providing a shotgun shell having a boundary defining an enclosed space and powder, shot, and a biodegradable wad confined within said enclosed space. In some embodiments, said biodegradable wad physically separates said powder from said shot and provides a gas sealing function. In some embodiments, the shot and the biodegradable wad are configured to be launched out of a barrel of a shotgun to expose said biodegradable wad to a terrestrial or aquatic environment. In some embodiments, said biodegradable wad biodegrades. In some embodiments, said biodegradable wad comprises a biodegradable polymer. In some embodiments, said biodegradable polymer comprises a polybutylene succinate adipate polymer.

In some embodiments, said biodegradable polymer comprises at least 80% by weight of a polybutylene succinate adipate polymer. In some embodiments, said biodegradable wad comprises at least 50% by weight of a polybutylene succinate adipate polymer. In some embodiments, said biodegradable wad comprises at least two biodegradable polymers, wherein said first biodegradable polymer comprises a polybutylene succinate adipate polymer and wherein said second biodegradable polymer comprises a polyhydroxyalkanoate polymer. In some embodiments, wherein the concentration by weight of said first biodegradable polymer to said second biodegradable polymer in said biodegradable wad is greater than four to one. In some embodiments, said biodegradable wad is a one-piece wad. In some embodiments, said one-piece wad comprises a cup portion that contains said shot within said shotgun shell, and wherein said cup portion includes slits. In some embodiments, the one-piece wad is the only wad within the shotgun shell. In some embodiments, said biodegradable wad is a gas sealing wad. In some embodiments, said shotgun shell encloses the biodegradable wad and another wad.

In some embodiments, a method of loading a shotgun shell is provided. The method can include providing a shotshell hull. The method can include providing powder. The method can include providing shot. The method can include providing a biodegradable wad. The method can include loading said powder, said biodegradable wad, and said shot into said shotgun hull. The method can include crimping said shotgun hull loaded with said powder, said biodegradable wad, and said shot. In some embodiments, said biodegradable wad comprises a biodegradable polymer. In some embodiments, said biodegradable polymer comprises a polybutylene succinate adipate polymer. In some embodiments, said biodegradable wad physically separates said powder from said shot and provides a gas sealing function.

In some embodiments, said biodegradable polymer comprises at least 80% by weight of a polybutylene succinate adipate polymer. In some embodiments, said biodegradable wad comprises at least 50% by weight of a polybutylene succinate adipate polymer. The method can include sequentially loading said powder, said biodegradable wad, and said shot into said shotgun hull. In some embodiments, said shotgun hull is a primed shotgun hull. In some embodiments, said biodegradable wad comprises at least two biodegradable polymers, wherein said first biodegradable polymer comprises a polybutylene succinate adipate polymer, wherein said second biodegradable polymer comprises a polyhydroxyalkanoate polymer. In some embodiments, the concentration by weight of said first biodegradable polymer to said second biodegradable polymer in said biodegradable wad is greater than four to one. In some embodiments, said biodegradable wad is a one-piece wad. In some embodiments, said one-piece wad comprises a cup portion that contains said shot within said shotgun hull, and wherein said cup portion includes slits. In some embodiments, the one-piece wad is the only wad within the shotgun hull. In some embodiments, said biodegradable wad is a gas sealing wad. In some embodiments, said shotgun hull encloses the biodegradable wad and another wad.

In some embodiments, a biodegradable shotgun wad comprising polybutylene succinate adipate is provided. In some embodiments, said biodegradable shotgun wad comprises a round component that is configured to obturate to form a gas seal within a barrel of a shotgun when said shotgun is fired. In some embodiments, said biodegradable shotgun wad comprises at least 50% by weight of a polybutylene succinate adipate polymer.

In some embodiments, said shotgun wad comprises a shot cup portion that is configured to contain shot within a shotgun shell. In some embodiments, said biodegradable shotgun wad comprises at least two biodegradable polymers, wherein said first biodegradable polymer comprises a polybutylene succinate adipate polymer and wherein said second biodegradable polymer comprises a polyhydroxyalkanoate polymer. In some embodiments, the concentration by weight of said first biodegradable polymer to said second biodegradable polymer in said biodegradable wad is greater than four to one. In some embodiments, biodegradable wad comprises a shot cup portion that is configured to contain shot within a shotgun shell.

In some embodiments, a shotgun shell is provided. The shotgun shell can include a shotgun case having a boundary defining an enclosed space. The shotgun shell can include a biodegradable wad confined within said enclosed space. In some embodiments, said biodegradable wad comprises a gas sealing wad. In some embodiments, said biodegradable wad comprises at least 50% by weight of a polybutylene succinate adipate polymer.

In some embodiments, a method of shooting a shotgun shell is provided. The method can include providing a shotgun case having a boundary defining an enclosed space and a biodegradable wad confined within said enclosed space. In some embodiments, said biodegradable wad is a gas seal wad situated immediately adjacent to the explosive to the powder. In some embodiments, said biodegradable wad comprises at least 50 percent by weight of a polybutylene succinate adipate polymer with a specific gravity greater than one. The method can include loading said shotgun case into a shotgun. The method can include firing the shotgun, whereby the biodegradable wad is discharged from the barrel of the gun. The method can include exposing said biodegradable wad to a terrestrial or aquatic environment. In some embodiments, said biodegradable wad biodegrades.

In some embodiments, a biodegradable wad component comprising a biodegradable polymer is provided. In some embodiments, said biodegradable wad component is suitable for use in a shotgun shell. In some embodiments, said biodegradable wad is an over powder wad that forms a gas seal upon firing. In some embodiments, said biodegradable polymer comprises at least 50% by weight of a polybutylene succinate adipate polymer with a specific gravity greater than one. In some embodiments, said biodegradable polymer comprises at least 60% by weight of a polybutylene succinate adipate polymer with a specific gravity greater than one.

Some biodegradable wads are commercially available; in fact, all wads used to be biodegradable. Until the invention of plastic wads, shotgun wads were made of cardboard, fiber, felt, cork, and other natural products, examples of which are still available commercially. However, plastic wads have price and performance advantages, resulting in their widespread adoption.

Biodegradable plastic wads have been taught but have yet to make a substantial impact commercially. Chiesa (WO2015033081 A1) teaches a biodegradable plastic wad comprising a blend of a polyalkylene succinate, including polybutylene succinate, with a polyhydroxyalkanoate polymer, preferably wherein the polyhydroxyalkanoate polymer is at least 7% by weight of the composition. Chiesa does not teach biodegradable wads comprising polybutylene succinate adipate. Compared with wads made from polybutylene succinate, gas sealing wads made from PBSA have enhanced toughness and enhanced rate of biodegradation. Havens et al. (U.S. Pat. No. 9,528,800) teach the use of a polyhydroxyalkanoate wad. Polyhydroxyalkanoate wads have excellent degradability, but tend to be too brittle or, if made more rubbery, too difficult to process. Shahid et al. (U.S. Pat. No. 5,859,090) teach the use of polycaprolactone shotgun wads. Polycaprolactone wads are problematic, among other reasons, because of the low melt temperature of the polymer. For example, if a polycaprolactone wad was left in a truck cab on a hot sunny day, shape changes in the wad could occur, which can compromise performance and could also be potentially dangerous.

Hampton et al. (GB 2496180) teach a composite material which includes a major percentage of a natural-starch polyester polymer and a minor percentage of powdered chemically-untreated straw. The straw provides uniform solidity to the finished composite material, thereby allowing use of the composite in conventional extruding and injection molding. The straw is essential to the device of Hampton to improve dimensional stability during molding of the material, and prevents or limits shrinkage. Unlike Hampton, the PBSA wads do not rely on straw for structural stability. In some embodiments, the wads do not include solid material such as straw in the material. Rather, in some embodiments, the PBSA itself provides dimensional stability and uniform solidity of the finished composite material.

Accordingly, there remains a need for a high-performance biodegradable shotgun wad. A modification to shotgun wads to mitigate the impact of aquatic, plastic debris would be a viable and effective option provided: 1) the modified shotgun wad has performance characteristics comparable to non-biodegradable plastic wads; 2) the wad degrades reasonably quickly once it is abandoned on land or in an aquatic environment, and, once degraded, is environmentally benign along with any additives; and 3) the wad is not too expensive to be of practical use. Due in part to the lack of a sufficiently viable alternative, government regulators fail to limit the enormous amount of plastic pollution created by sportsmen each year.

Herein we describe a degradable gas sealing shotgun wad that reduces plastic pollution in the environment by utilizing a PBSA polymer. Herein we describe a method of utilizing a degradable shotgun wad to reduce aquatic debris. The method comprises the steps of providing a gas sealing shotgun wad comprising a PBSA polymer. After the shotgun shell is fired, the wad becomes exposed to the environment, where it degrades rapidly such that it poses substantially less risk to wildlife and the greater ecosystem.

BRIEF DESCRIPTION OF THE DRAWINGS

The summary above, and the following detailed description, will be better understood in view of the drawings which depict details of preferred embodiments.

FIG. 4A is a photographic image showing the side and bottom of the gas seal; i.e., the end of the gas seal in direct contact with the powder, while FIG. 4B is a photographic image showing the side and the top end (i.e., the end closest to the shot) of the gas seal.

DETAILED DESCRIPTION

The present disclosure is directed to biodegradable shotgun wads and methods for reducing plastic debris in aquatic ecosystems by using a wad comprising a polybutylene succinate adipate polymer (PBSA), also referred to as poly (butylene succinate co-adipate).

Figure 1:
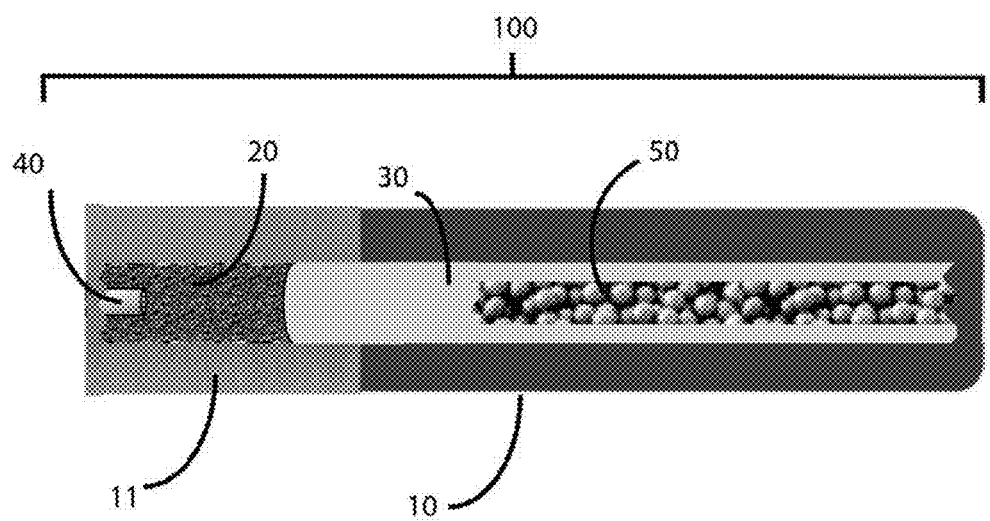
FIG. 1 shows a cutaway perspective view of a shotgun shell.

The term "wad" refers to a component of a shotgun shell that is used to separate the shot from the powder, and/or to provide a seal that prevents gas from blowing through the shot rather than propelling the shot out of the shotgun, and/or contain the shotgun shot, and/or provide cushioning, and/or fill space in the shell. Commercial wads often consist of three parts: the powder wad, the cushion, and the shot cup, which may be in separate pieces or can be incorporated into a single component. The wad is stored within a shotgun shell. As shown in FIG. 1, which is a schematic diagram showing components of a shotgun shell 100, the casing 10, here shown to include a brass head 11, contains a powder charge 20 adjacent to the wad 30. Upon firing, the primer 40 ignites the powder charge 20, which propels the wad 30 and shot 50 through the barrel of the shotgun. The wad holds the shot together as it moves down the barrel after firing of the gun. Both the shot and the wad tend to travel significant distances after leaving the barrel and are often abandoned by the shooter. The term "wad" includes, but is not limited to, over powder wads, over shot wads, cushion wads, and shot wads (including shot pipe wads and shot cups). The over powder wad typically provides the gas sealing function, and such wads are also referred to as powder wads, or gas seals, or gas sealing wads. In all embodiments described herein, the wads have a gas sealing function (irrespective of whether they provide other functions sometimes provided by wads), and comprise PBSA.

Figure 2:
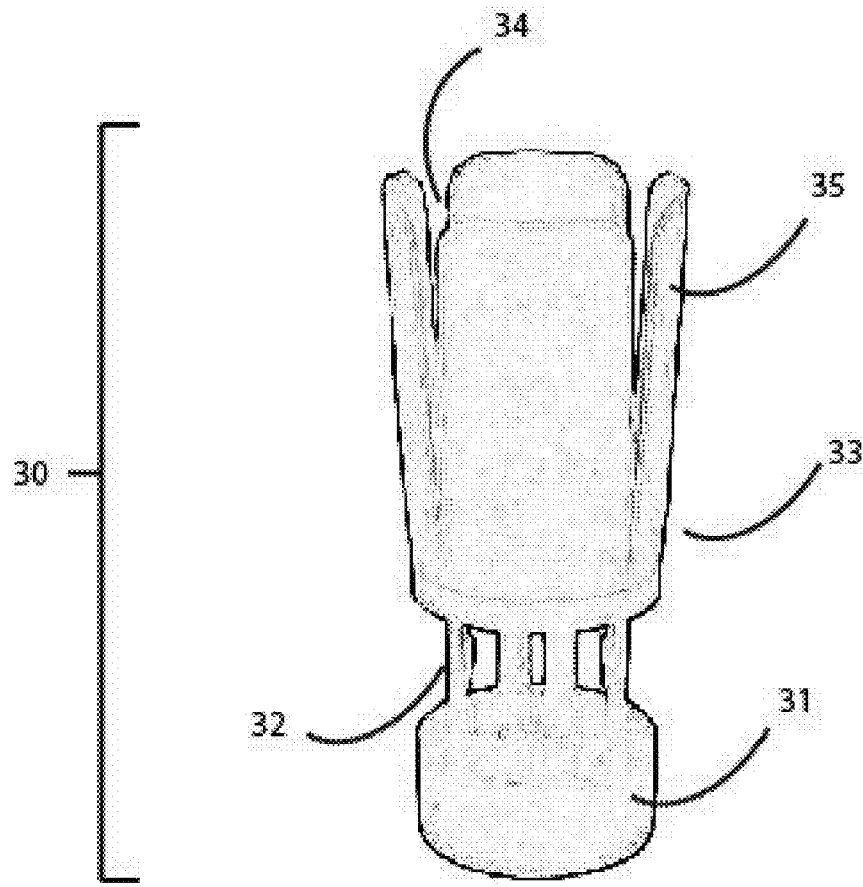
FIG. 2 shows a perspective view of one embodiment of a one-piece biodegradable shotgun wad comprising PBSA.

FIG. 2 shows a representative one-piece PBSA wad 30 that provides all of the requisite wad functions. The gas sealing function is provided by component 31 at the bottom of the wad, which also serves to separate the shot from the powder in the shell. There is a crush section 32 that provides some cushioning for the shooter upon firing. There is a shot cup component 33, which contains the shot. There are slits 34 within the shot cup component 33, with each pair of slits separating a petal component 35. The petal component typically folds back to release the shot after leaving the barrel, and does so typically within one meter of leaving the barrel. One-piece wads are particularly common in target shooting loads.

Figure 3:
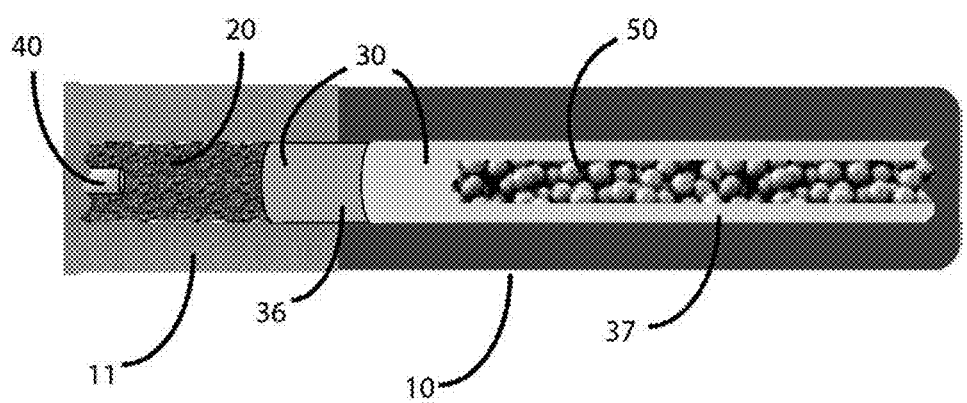
FIG. 3 shows a cutaway perspective view of one embodiment of a shotgun shell loaded with a multi-component wad system comprising a gas seal comprising PBSA and a second wad that is a shot cup wad.

FIG. 3 is a schematic cutaway diagram showing a shotgun shell with a multi-component wad system as described herein. The casing 10 (cutaway in the diagram to reveal the contents inside the casing) contains a powder charge 20 beneath a multi-component wad system 30. Upon firing, the primer 40 ignites the powder charge 20, which propels the wad system 30 and shot 50 through the barrel of the shotgun. The wad system 30 includes both a powder wad 36 and a shot wad 37 (also cutaway to reveal the shot inside the shot wad). In this representative embodiment, the casing 10 includes a brass base 11. The wad system holds the shot together as it moves down the barrel after firing of the gun. Both the shot and the wad system tend to travel significant distances and are often abandoned by the shooter.

Figure 4A:
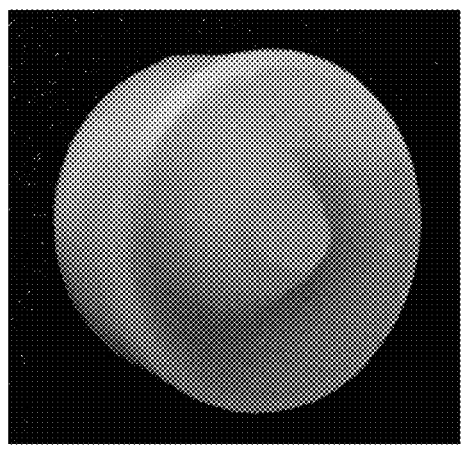
FIGS. 4A and 4B show a photographic image of one embodiment of a PBSA gas seal wad.
Figure 4B:
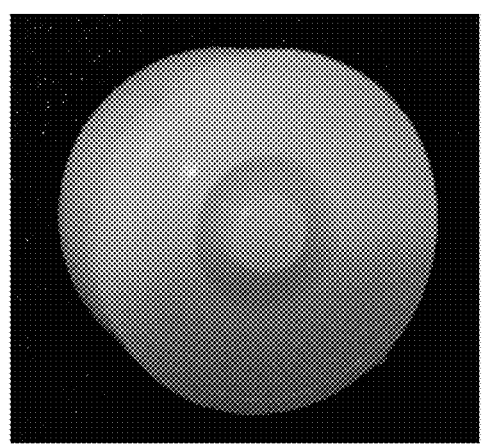

FIGS. 4A and 4B show photographic images of one embodiment of a PBSA gas seal wad. The side of the wad shown in FIG. 4A constitutes the bottom of this gas seal wad, and this side would be adjacent to the powder. The side of the wad shown in FIG. 4B constitutes the top of the this gas seal wad comprising PBSA, and the shot would be loaded on top of this side of the wad, optionally after a shot cup wad or shot pipe wad. This pictured wad would typically be used in a multi-component wad system that utilizes, for example, a shot cup wad in addition to the gas seal wad shown in FIGS. 4A and 4B. Any other wad designs that provide a gas sealing function are contemplated herein. In some embodiments, the PBSA gas seal wad comprises a disc or another flat or thin or round object. In some embodiments, the PBSA gas seal wad comprises a cup or another concave or cylindrical or carved out or other shape. In some embodiments, the PBSA gas seal wad comprises a side wall or another retainer or perimeter or barrier. In some embodiments, the PBSA gas seal wad comprises an enclosed or partially enclosed shape such that at least one end of the wad is open, and in some embodiments, both ends of the wad are open. In some embodiments, the PBSA gas seal wad is any shape to perform the function of obturating, blocking, or obstructing.

The wads herein described are compatible with various types of shotgun shells. It is anticipated that the wads will be incorporated, for example, into shotgun shells used for waterfowl hunting. It is envisioned that the wads described herein can be inexpensively substituted for existing wads, thereby providing the desired degradability without adversely impacting the cost. The wads herein described are also suitable when used in shotgun shells for hunting larger game (e.g., using buckshot loads), smaller game, home defense, target shooting (e.g., trap shooting, skeet shooting, and sporting clays), and other purposes for which shotguns are useful.

The PBSA wads described herein can have any conventional or future design that is suitable for shotgun wads, provided they provide the function of forming a gas seal. In some embodiments, the gas sealing wads comprising PBSA are symmetric such that both the top and bottom side are identical. For example, one widely used symmetric gas seal design is the X12X gas seal, available from Ballistic Products in Corcoran, Minn. Symmetrical gas seals can be advantageous because they can simplify loading, particularly when using automated or semi-automated loading machines.

The PBSA gas sealing wads can be combined with other shotgun shell loading components in any suitable manner, such other components including other wads as desired (e.g., overshot wad, shot wad, cushioning wad, filler wad, etc.), any size or suitably shaped hull, primer, powder, shot, buffer, etc. For example, hulls can be for 8 ga, 10 ga, 12 ga, 16 ga, 20 ga, 24 ga, 28 ga, 32 ga, or .410 bore shotguns, and can be any appropriate length (e.g., including but not limited to 2½ inch, 2¾ inch, 3 inch, 3½ inch) and shape (e.g., straight sides, tapered). Any suitable shot material can be used (including but not limited to lead, steel, copper, tungsten, bismuth, and alloys and combinations thereof), in any suitable size (including but not limited to the range from No. 9 shot to 000 buckshot), in any shape (including but not limited to spherical, rough spherical, and hexagonal), and in any payload.

PBSA is a copolymer typically synthesized via condensation of succinic acid, adipic acid, and 1,4-butanediol. As contemplated herein, the content of the adipic acid co-monomer can be between 1% and 40%, while the content of the succinic acid co-monomer can be between 60% and 99%. Mechanical strength initially rises with increased adipic acid monomer content at very low levels of adipic acid monomer (e.g., 5% molar levels or less), but then begins to decrease as adipic acid molar levels increase. As the adipic acid monomer content increases, the glass transition temperature and melt temperature tend to drop. Moreover, biodegradability increases as the adipic acid monomer concentration rises (at least through 20% adipic acid monomer content). Compared to polybutylene succinate, PBSA has superior impact resistance and biodegradability, two very important features for shotgun gas sealing wads. In general, PBSA has superior biodegradability to PBS. PBSA typically has a melt flow rate of less than 3 g/10 minutes, a density of greater than 1.2 g/cm$^3$, a weight average molecular mass of between 10,000 g/mol and 500,000 g/mol, and a glass transition temperature below 0° C., for example, a glass transition temperature of −45° C. The tensile elongation at break should be at least 600% in the machine direction when tested in accordance with ISO 527-3, and the impact strength in accordance with ASTM D3420 should be at least 25 kJ/m. The chemical structure for PBSA is reproduced below.

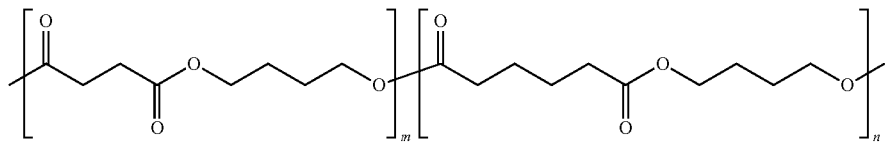

30

PBS(x) refers to the polybutylene succinate family of polymers, which includes polybutylene succinate and polybutylene succinate copolymers that can be synthesized via condensation of succinic acid, 1,4-butanediol, and one or more additional diacids. For example, adipic acid is the diacid co-monomer that is added to produce PBSA, which is also referred to as poly(butylene succinate-co-adipate) or polybutylene succinate adipate. As contemplated herein, the content of the succinic acid co-monomer in PBS(x) can be between 60% and 100%. This concentration would be 100% when the polymer is PBS (i.e., when there is no co-monomer component), and the concentration of the succinic acid co-monomer can be as low as 60% for copolymers such as PBSA. As described herein, PBS(c) refers to polybutylene succinate copolymers containing a diacid co-monomer other than adipic acid. Gas sealing wads comprising at least 50% by weight PBSA have been demonstrated to form superior gas seals relative to other biodegradable plastics that have good biodegradability on both land and water, but which tend to be excessively brittle at cold temperatures (and therefore do not maintain a gas seal when shot), or are plagued by processing issues during production (leading to quality control issues and higher cost), or stability issues post-production.

With some biodegradable plastics, PBSA forms acceptable blends although it is often not miscible. In order to maintain the desirable toughness, it is important to keep PBSA as the majority component in any such blend. In preferred embodiments, the total fraction of biodegradable polymers in the wad by weight is at least 80% PBSA.

In some embodiments, the wad comprises PBSA in a percentage by weight greater than 50%, greater than 55%, greater than 60%, greater than 65%, greater than 70%, greater than 75%, greater than 80%, greater than 85%, greater than 90%, greater than 95%, between 40% and 60%, between 50% and 70%, between 60% and 80%, between 70% and 90%, between 80% and 100%, approximately 50%, approximately 55%, approximately 60%, approximately 65%, approximately 70%, approximately 75%, approximately 80%, approximately 85%, approximately 90%, approximately 95%, or approximately 100%, or ranges incorporating any of the foregoing values. In some embodiments, the wads consist essentially of PBSA. The PBSA wad compositions can contain additives, including but not limited to plasticizers, stabilizers, solvents, coloring agents, anti-oxidants, anti-fouling agents, UV stabilizers, and photodegradation accelerators. In some embodiments, the wad comprises additives in a percentage by weight between 0% and 20%, between 10% and 30%, less than 30%, less than 25%, less than 20%, less than 15%, less than 10%, less than 5%, approximately 30%, approximately 25%, approximately 20%, approximately 15%, approximately 10%, approximately 5%, or approximately 0%, or ranges incorporating any of the foregoing values.

In some embodiments, the wad comprises a biodegradable polymer. In some embodiments, the wad comprises two or more biodegradable polymers (e.g., two biodegradable polymers, three biodegradable polymers, four biodegradable polymers, five biodegradable polymers, etc.). In some embodiments, a biodegradable polymer comprises PBSA in a percentage by weight greater than 50%, greater than 55%, greater than 60%, greater than 65%, greater than 70%, greater than 75%, greater than 80%, greater than 85%, greater than 90%, greater than 95%, between 40% and 60%, between 50% and 70%, between 60% and 80%, between 70% and 90%, between 80% and 100%, approximately 50%, approximately 55%, approximately 60%, approximately 65%, approximately 70%, approximately 75%, approximately 80%, approximately 85%, approximately 90%, approximately 95%, or approximately 100%, or ranges incorporating any of the foregoing values.

One suitable PBSA material is BIONOLLE 3001 MD (available from Showa Denko in Japan). Blends with other biodegradable polymers, including but not limited to a polyhydroxyalkanoate polymer (PHA), polycaprolactone (PCL), polybutylene succinate (PBS), polylactic acid (PLA), and polysaccharides, are all contemplated herein. In preferred embodiments that incorporate an additional biodegradable polymer, the weight fraction of PBSA as a percentage of the total biodegradable polymer composition is greater than 80%. In some preferred embodiments, the weight fraction of PBSA as a percentage of the total biodegradable polymer composition is equal to or greater than 90%. In some embodiments, the weight fraction of PBSA as a percentage of the total biodegradable polymer composition is greater than 50%, greater than 55%, greater than 60%, greater than 65%, greater than 70%, greater than 75%, greater than 80%, greater than 85%, greater than 90%, greater than 95%, between 40% and 60%, between 50% and 70%, between 60% and 80%, between 70% and 90%, between 80% and 100%, approximately 50%, approximately 55%, approximately 60%, approximately 65%, approximately 70%, approximately 75%, approximately 80%, approximately 85%, approximately 90%, approximately 95%, or approximately 100%, or ranges incorporating any of the foregoing values.

Polyhydroxyalkanoates (PHA) are biological polyesters synthesized by a broad range of natural and genetically engineered bacteria as well as genetically engineered plant crops. In general, a PHA is formed by polymerization of one or more monomer units inside a living cell. Over 100 different types of monomers have been incorporated into PHA polymers (Steinbuchel and Valentin, 1995, FEMS Microbiol. Lett. 128:219-228). Examples of monomer units incorporated in PHAs include 2-hydroxybutyrate, lactic acid, glycolic acid, 3-hydroxybutyrate (hereinafter referred to as 3HB), 3-hydroxypropionate (hereinafter referred to as 3HP), 3-hydroxyvalerate (hereinafter referred to as 3HV), 3-hydroxyhexanoate (hereinafter referred to as 3HH), 3-hydroxyheptanoate (hereinafter referred to as 3HHep), 3-hydroxyoctanoate (hereinafter referred to as 3HO), 3-hydroxynonanoate (hereinafter referred to as 3HN), 3-hydroxydecanoate (hereinafter referred to as 3HD), 3-hydroxydodecanoate (hereinafter referred to as 3HDd), 4-hydroxybutyrate (hereinafter referred to as 4HB), 4-hydroxyvalerate (hereinafter referred to as 4HV), 5-hydroxyvalerate (hereinafter referred to as 5HV), and 6-hydroxyhexanoate (hereinafter referred to as 6HH). 3-hydroxyacid monomers incorporated into PHAs are the (D) or (R) 3-hydroxyacid isomer with the exception of 3HP which does not have a chiral center. In some embodiments, the PHA described herein is a homopolymer (where all monomer units are the same). Examples of PHA homopolymers include poly 3-hydroxyalkanoates (e.g., poly 3-hydroxypropionate (hereinafter referred to as P3HP), poly 3-hydroxybutyrate (hereinafter referred to as PHB) and poly 3-hydroxyvalerate), poly 4-hydroxyalkanoates (e.g., poly 4-hydroxybutyrate (hereinafter referred to as P4HB), or poly 4-hydroxyvalerate (hereinafter referred to as P4HV)), and poly 5-hydroxyalkanoates (e.g., poly 5-hydroxyvalerate (hereinafter referred to as P5HV)). In certain embodiments, the starting PHA can be a copolymer (containing two or more different monomer units) in which the different monomers are randomly distributed in the polymer chain. Examples of PHA copolymers include poly 3-hydroxybutyrate-co-3-hydroxypropionate (hereinafter referred to as PHB3HP), poly 3-hydroxybutyrate-co-4-hydroxybutyrate (hereinafter referred to as PHB4HB), poly 3-hydroxybutyrate-co-4-hydroxyvalerate (hereinafter referred to as PHB4HV), poly 3-hydroxybutyrate-co-3-hydroxyvalerate (hereinafter referred to as PHB3HV), poly 3-hydroxybutyrate-co-3-hydroxyhexanoate (hereinafter referred to as PHB3HH) and poly 3-hydroxybutyrate-co-5-hydroxyvalerate (hereinafter referred to as PHB5HV). By selecting the monomer types and controlling the ratios of the monomer units in a given PHA copolymer, a range of material properties can be achieved.

The present application is related to U.S. patent application Ser. No. 14/303,496, filed Jun. 12, 2014, which claims priority under 35 U.S.C. § 119(e) to U.S. Provisional Patent Application No. 61/835,053, filed Jun. 14, 2013, the disclosure of each application is incorporated by reference herein in its entirety. A chemical structure for PHA is reproduced below.

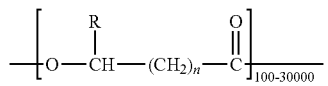

The R group can include, but is not limited to, hydrogen, methyl, ethyl, propyl, pentyl, and nonyl and the variable n can include 1, 2, and 3. Some common PHA polymers for n=1 include poly-3-hydroxypropionate, poly-3-hydroxybutyrate, polyhydroxyvalerate, poly-3-hydroxyhexanoate, poly-3-hydroxyoctanoate, poly-3-hydroxydodecanoate, n=2 include poly-4-hydroxybutyrate, n=3 include poly-5-hydroxyvalerate. Co-polymers thereof, include poly(3-hydroxybutyrate-co-4-hydroxybutyrate), also known as P(3HB-co-4HB); poly(3-hydroxybutyrate-co-valerate; also known as PHBV; poly(3-hydroxybutyrate-co-3-hydroxyhexanoate), also known as PHBH. The Nodax class of PHA polymers, originally developed at Procter and Gamble and currently sold commercially by Danimer Scientific, includes PHBH and also other PHA copolymers that contain 3-hydroxybutyrate monomer units as well as other 3-hydroxyalkanoate monomer units having longer side chains. There are numerous commercial suppliers of PHA. One commercial supplier is Danimer Scientific, who supply PHA under the trade name Nodax™. The molecular weight of PHA is typically in the range of $1 \times 10^5$ to $8 \times 10^6$ daltons.

Blends of PBSA with a relatively small amount (0.1-25%) of PHA may be beneficial in accelerating the rate of biodegradation in marine environments relative to PBSA wads that contain no PHA. In preferred embodiments of such blends, the weight fraction of PBSA as a percentage of the total biodegradable polymer composition is greater than 80%. In more preferred embodiments, the weight ratio of PBSA to PHA is greater than 8:1. We have found that processability of blends with higher concentrations of PHA tends to be poor, and additives that enhance the processability of said blends can increase persistence or toxicity of the resulting wads in the environment.

In some embodiments of such blends, the weight fraction of PBSA as a percentage of the total biodegradable polymer composition is greater than 50%, greater than 55%, greater than 60%, greater than 65%, greater than 70%, greater than 75%, greater than 80%, greater than 85%, greater than 90%, greater than 95%, between 40% and 60%, between 50% and 70%, between 60% and 80%, between 70% and 90%, between 80% and 100%, approximately 50%, approximately 55%, approximately 60%, approximately 65%, approximately 70%, approximately 75%, approximately 80%, approximately 85%, approximately 90%, approximately 95%, or approximately 100%, or ranges incorporating any of the foregoing values. In some embodiments, the weight ratio of PBSA to PHA is greater than 3:1, greater than 4:1, greater than 5:1, greater than 6:1, greater than 7:1, greater than 8:1, greater than 9:1, greater than 10:1, greater than 11:1, greater than 12:1, greater than 13:1, greater than 14:1, greater than 15:1, approximately 7:1, approximately 8:1, approximately 9:1, approximately 10:1, approximately 11:1, or approximately 12:1, or ranges incorporating any of the foregoing values.

In some embodiments, the wad comprises PHA in a percentage by weight less than 25%, less than 20%, less than 15%, less than 10%, less than 5%, less than 1%, greater than 0%, greater than 1%, greater than 3%, greater than 5%, greater than 10%, greater than 15%, greater than 20%, greater than 25%, between 0.1% and 5%, between 5% and 10%, between 10% and 15%, between 1% and 20%, between 1% and 30%, approximately 0.1%, approximately 1%, approximately 5%, approximately 10%, approximately 15%, approximately 20%, or approximately 25%, or ranges incorporating any of the foregoing values. In some embodiments, the wads consist essentially of PBSA and PHA. Like PBSA, PHA eventually breaks down into benign monomers, oligomers, and byproducts. In some embodiments, the wads consist essentially of materials that break down into benign monomers, oligomers, and byproducts.

The term "effective amount," as used herein, refers to that amount of PHA that imparts a biodegradation effect on a PBSA component. For example, an effective amount can refer to the amount of PHA that improves a biodegradation by at least 1%, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 100%, or ranges incorporating any of the foregoing values. In some embodiments, an improvement in a biodegradation can be the reduction of days before complete degradation. In some embodiments, an improvement in fracturing of a spent wad is an improvement in degradation.

In some embodiments, the wad can comprise a material having two or more different constituent materials with different material properties. In some embodiments, the two constituent materials can be PBSA and PHA. In some embodiments, the two constituent materials break down into benign monomers, oligomers, and byproducts. When combined, the two or more different constituent materials produce a distinct material with characteristics that are different than the two constituent materials. In some embodiments, the composite has improved degradation. In some embodiments, the two or more different constituent materials comprise a percentage by weight of the total wad greater than 50%, greater than 55%, greater than 60%, greater than 65%, greater than 70%, greater than 75%, greater than 80%, greater than 85%, greater than 90%, greater than 95%, between 40% and 60%, between 50% and 70%, between 60% and 80%, between 70% and 90%, between 80% and 100%, approximately 50%, approximately 55%, approximately 60%, approximately 65%, approximately 70%, approximately 75%, approximately 80%, approximately 85%, approximately 90%, approximately 95%, or approximately 100%, or ranges incorporating any of the foregoing values. In some embodiments, the total materials other than the two or more different constituent materials comprise a percentage by weight of the total wad between 0% and 40%, between 10% and 30%, less than 30%, less than 25%, less than 20%, less than 15%, less than 10%, less than 5%, approximately 30%, approximately 25%, approximately 20%, approximately 15%, approximately 10%, approximately 5%, or approximately 0%, or ranges incorporating any of the foregoing values.

Biodegradable compositions used in wads described herein can include additives including but not limited to other polymers (including non-biodegradable polymers), lubricants, release agents, plasticizers, impact modifiers, nucleating agents, colorants, stabilizers, photodegradation agents, fillers, and plasticizers. In all such compositions, the PBSA content remains above 50% by weight of the wad, preferably above 60% by weight of the wad.

In some embodiments, the wad can comprise a material without a non-degradable reinforcing structure such as fibers. In some embodiments, the wad can comprise a material without a non-degradable matrix or binder.

Some manufacturers claim that their shotgun wads are degradable. However, these wads often consist of non-degradable plastic in a matrix of degradable materials. The degradable materials break down, leaving behind small fragments of non-degradable plastic. Non-degradable plastics can break apart over time into smaller and smaller pieces. These microplastics can pose substantial risk to the entire aquatic food web.

Microplastic fragments range in size from a few to five hundred micrometers. Due to their abundance, microplastics have become a significant marine debris concern worldwide. Once microplastics enter the aquatic ecosystem, their buoyancy, size, and longevity within the water column lead to ongoing problems. Microplastics can be ingested by both pelagic and benthic organisms. Studies have shown microplastic uptake by marine species including filter-feeders, detritivores, deposit feeders, and planktivores. Microplastics accumulate in the fatty tissue of aquatic species. The fatty tissues become more concentrated with microplastics as organisms mature, posing a significant risk for higher order species. For instance, studies have shown the tropic transfer of microplastics from mussels to the crabs that feed on them (Farrell, P. and K. Nelson. 2013. Trophic level transfer of microplastic: *Mytilus edulis* (L.) to *Carcinus maenas* (L.). Environmental Pollution 177: 1-3).

An increasing concern is that microplastics can sorb and concentrate contaminants and pollutants. Therefore, not only are microplastics accumulating in the tissues of organisms, but pollutants are also accumulating. These pollutants are transported throughout the food web to organisms at various trophic levels. Therefore, non-degradable shotgun wads ultimately contribute to the destruction of the aquatic ecosystem.

Additionally, many non-biodegradable polymers (such as polyethylene) float in water, causing a plastic wad in an aquatic environment to sometimes remain suspended in the water column and travel long distances. In contrast, PBSA has a specific gravity around 1.25, causing its tendency to sink. In some embodiments, PBSA formulations have a specific gravity greater than the ambient aquatic environment. The specific gravity of the gas sealing wad in g/cm3 can be greater than that of water, greater than one, greater than saltwater, greater than 1.025, greater than 1.1, greater than 1.2, greater than 1.3, between 1 and 1.45, or between 1.2 and 1.45, or ranges incorporating any of the foregoing values. PBSA is negatively buoyant and will tend to sink in the ambient aquatic environment. Negative buoyancy reduces the potential distance that PBSA wads can travel. Further, the negative buoyancy allows the degradable wad to be continuously submerged, which can potentially increase the rate of degradation. PBSA eventually breaks down into benign monomers, oligomers, and byproducts. Many conventional plastics do not degrade into benign monomers and oligomers in terrestrial or aquatic environments, or do so on a geologic timescale.

There are many variables that impact when and if a spent shotgun wad will degrade. Note that a spent biodegradable PBSA wad may be ejected onto land or water, and could move from one environment to the other. The time to degradation is complicated by the variability in different micro-environments around the planet. For example, underwater aquatic environments can have substantial variability in terms of pressure, temperature, salinity, and biodiversity, all of which can impact the rate of degradation. Further, degradation is not always consistent throughout the component. For example, the injection molding process can have an influence. Moderating the rate of degradation of a shotgun wad can be achieved, for example, by altering any of a number of factors, including but not limited to: the molecular weight of the polymer, the choice of or concentration of plasticizer or other additives, a coating on the polymer, surface imperfections, or the design of the biodegradable wad, in particular its thickness.

A biodegradable gas sealing shotgun wad described herein breaks down in the environment into environmentally benign components. Ammunition shot from the deck of a cruise ship or aircraft carrier in the deep ocean will result in a spent wad that will sink to the bottom of the ocean, an environment that may be anoxic and might not be conducive for biodegradation (e.g., shipwrecked wooden boats can remain remarkably well-preserved after hundreds of years in such environments). Other environments might also not be particularly favorable for biodegradation, so one cannot unequivocally state a time in which the wads will always biodegrade. Moreover, the thickness of the wad has a significant impact on its environmental persistence. One can, however, be confident that under most relevant conditions, the PBSA wads will biodegrade reasonably quickly without negatively impacting the environment. For example, the PBSA can degrade completely within 10 years, or within 5 years, or within 2 years, or within 2 months, depending on the environment. The PBSA wad can degrade by a percentage weight (e.g., about 25%, about 30%, about 40%, about 50%, about 55%, about 60%, about 70%, about 90%, about 100%, 100%, between 25% and 50%, between 40% and 60%, between 60% and 65%, between 65% and 70%, between 70% and 75%, between 75% and 80%, between 80% and 85%, between 85% and 90%, between 90% and 95%, between 95% and 100%, greater than 25%, greater than 50%, greater than 55%, greater than 60%, greater than 65%, greater than 70%, greater than 75%, greater than 80%, greater than 85%, greater than 90%, or greater than 95%, or ranges incorporating any of the foregoing values) with a certain period of time (e.g., 12 month, 13 months, 14 months, 15 months, 16 months, 17 months, 18 months, 19 months, 20 months, 21 months, 22 months, 23 months, 24 months, 25 months, 26 months, 27 months, 28 months, 29 months, 30 months, 31 months, 32 months, 34 months, 35 months, or 36 months, or 37 months, or 38 months, or 39 months, or 40 months, or ranges incorporating any of the foregoing values).

The PBSA wads can be produced using any suitable production process known in the art. For example, the PBSA wads can be produced by injection molding, extrusion, low pressure molding, gas-assist molding, structural foam molding, coinjection, reaction-injection molding, blow molding, rotational molding, thermoforming, compressing molding, etc.

Through field testing, it was discovered that biodegradable gas sealing wads comprising PBSA are sufficiently tough to withstand being discharged from a shotgun and obturate to form a good gas seal, as further described in the examples below, while also being biodegradable.

Therefore, degradable wads comprising PBSA have notable advantages. The material is environmentally benign and biodegrades in terrestrial and aquatic environments when submerged. Further, gas sealing wads comprising PBSA are as functional as commercially available polyethylene gas sealing wads and can provide fully functioning gas seals.

In some embodiments, the PBSA wad has the unexpected advantage of better performance. The PBSA wads have as good as or better results than commercial ammunition, as described herein. Compared with commercial ammunition that utilizes conventional plastic wads, ammunition that incorporates the PBSA wads described herein often provides more shot on target, including more consistent coverage in the target zone, resulting in a higher kill percentage. Many sportsmen have turned away from "degradable" shotgun shells such as paper wads since these wads do not perform as well as non-degradable plastic wads. However, as disclosed herein, the PBSA wads have better results based on pattern analysis software when fired at comparable velocity. In an example below, the PBSA wads have a significantly higher percentage shot on target compared with commercial ammunition that utilizes conventional plastic wads.

In some embodiments, the PBSA wad has the unexpected advantage, relative to other biodegradable polymers, of staying intact when used as the gas sealing wad. In an example below, the PBSA gas seals stayed intact during flight and landing. The PBSA gas seals can be recovered intact downrange. This is in contrast to shot pipe wads made from, for example, PHA, which fragmented when loaded in the same shells. The fragments of the shot pipe wad traveled less distance than the PBSA gas seal. The PHA shot pipe can stay intact until exiting the barrel, but fragmentation occurs very soon thereafter. The PBSA gas seals typically stay intact for the entire flight duration and landing. The PBSA gas sealing wad is designed not to fragment during and immediately after shooting. In some embodiments, the PBSA gas seals contain a minor percentage of PHA, and are designed to stay intact during and immediately after being shot. In some embodiments, the PBSA gas seals contain a minor percentage of PHA, and are designed to stay intact during the duration of the flight but fragment and/or erode quickly during degradation.

In some embodiments, the PBSA wad with a minor percentage of PHA has the unexpected advantage of outperforming wads of PBSA. In an example below, wads with a compounded formula of 9:1 weight ratio of PBSA to PHA outperformed wads in which PBSA was the only biodegradable polymer. In some embodiments, the PBSA wad with a minor percentage of PHA had the unexpected advantage of greater resistance to cracking. In some embodiments, the PBSA wad with a minor percentage of PHA had the unexpected advantage of a higher average velocity. In some embodiments, the PBSA wad with a minor percentage of PHA had the unexpected advantage of better shot patterns.

In some embodiments, the PBSA wad with a minor percentage of PHA has the unexpected advantage of degrading faster than wads of PBSA. PBSA and PHA both have a specific gravity greater than 1, causing the tendency for the wad to sink, which can reduce the likelihood of adsorbing floating organic toxins, reduce the likelihood of migrating long distances (e.g., into the middle of the Pacific Ocean), reduce the likelihood of being consumed by sea birds, and accelerate the rate of biodegradation. The minor percentage of PHA has the unexpected advantage of increasing degradability. In some embodiments, the PBSA wad with minor percentage of PHA has the unexpected advantage of increasing degradability in salt water relative to PBSA wads.

In some embodiments, the PBSA wad can be advantageously produced in a number of wad configurations. The PBSA wad can be a one-piece wad with a gas sealing section. The PBSA wad can be gas sealing component only. The PBSA wad can advantageously stay intact. The PBSA wad with the shot cup section can be designed with petals or other features to control the shot. The PBSA wad can include petals designed to fold back to release the shot. The PBSA polymer can advantageously be formed into a variety of shapes and features necessary for the wad to perform its function.

In some embodiments, the PBSA wad can advantageously perform in a variety of conditions. In an example below, the PBSA wads can perform at a variety of temperatures. The PBSA wads can perform at a variety of ambient environments, regardless of humidity or due point. The PBSA wads can perform in a variety of weather conditions and perform as well as commercial ammunition in rain, sleet, hail, snow, wind, extreme heat, or other conditions. Further, PBSA wads are as functional as commercially available wads and are sufficiently durable to withstand being discharged from a shotgun. In some embodiments, the PBSA wads do not undergo a structural change upon firing, allowing them to stay primarily intact within the barrel and during flight. In some embodiments, the PBSA wad or the PBSA wad with a minor percentage of PHA then break apart into small fragments during degradation.

By utilizing a gas sealing wad comprising PBSA, the function of the wad remains the same, while the environmental footprint of sportsmen and sportswomen substantially decreases. For example, aquatic creatures would be exposed to less microplastics and toxins, permitting more robust waterfowl species in a purer environment. Hunters have a direct stake in the health of waterfowl and are often on the forefront lobbying for more environmentally sound alternatives. Both functional and ecological considerations weigh in favor of PBSA as a suitable material for gas sealing shotgun wads.

EXAMPLES

Plastic resins can be obtained from numerous suppliers. For example, PBS and PBSA can be obtained from Showa Denko K.K. in Tokyo, Japan); PHA can be obtained from Danimer Scientific in Bainbridge, Ga.; PLA can be obtained from NatureWorks in Minnetonka, Minn.; and PCL can be obtained from Perstorp in Warrington, England. Plastic resins can also be obtained from other suppliers.

Example 1

Formulations of PBSA (BIONOLLE™ 3001 MD, made by Showa Denko K.K. in Tokyo, Japan) were utilized to form powder wads. Primed 3-inch hulls were loaded with powder, a PBSA powder wad, a shot wad using a shot cup design that was injection molded with a PHA formulation (MIREL® P1004, made by Metabolix Inc. in Cambridge, Mass.) and 1¼ ounces of #2 steel shot, then crimped. The shotgun shells were fired from a shotgun at targets to compare shot patterns with commercial ammunition. Performance was as good as or better than comparable commercial ammunition that was tested (including statistically equivalent average speed), based on having more shot on target and a higher kill percentage as determined using pattern analysis software (Shotgun Analyzer software available from Target Telemetrics in Martin, Mich.).

Example 2

Formulations of PBSA were utilized to form gas seal wads for 12 gauge shotguns. The PBSA powder wads, with a length of approximately 8 mm, were loaded into shells with powder, #2 steel shot (1¼ ounces), and a biodegradable shot wad (specifically a shot pipe wad, with two open ends, approximately 44 mm in length and having a slightly tapered design with an average wall thickness of approximately 1.4 mm) made from a polyhydroxyalkanoate polymer designed and formulated to fracture after leaving the shotgun barrel upon firing. Sufficient powder was used to generate an average velocity of 1338 fps, as measured using an Edgertronic high-speed camera.

Figure 5:
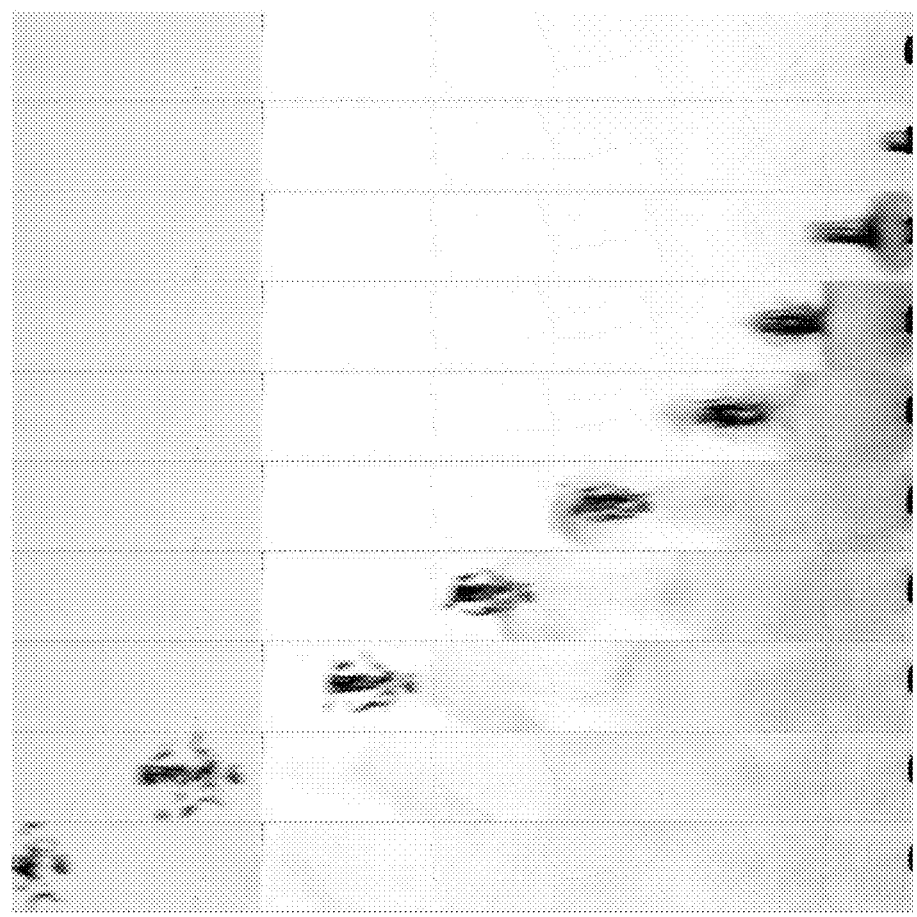
FIG. 5 shows a time series of photographic images taken with an Edgertronic high-speed camera at roughly 30,000 frames per second, showing images of a shotgun firing a shell loaded with a multi-component wad system including a gas sealing wad comprising PBSA. The series of images shows the shot and wads leaving the shotgun barrel just after the weapon is fired.

FIG. 5 shows a time series set of images from one such shot, showing the flash of the gun, the emergence of the shot and wad, and then the fragmentation of the shot pipe wad soon after it leaves the barrel. In contrast to the shot pipe wad, the gas seal wad stays intact. FIG. 5 shows a PHA shot wad breaking into many pieces and a PBSA gas seal intact. FIG. 5 shows early breakup of the PHA shot wad, but the wad is still intact inside barrel and immediately upon exit of the barrel.

Figure 6:
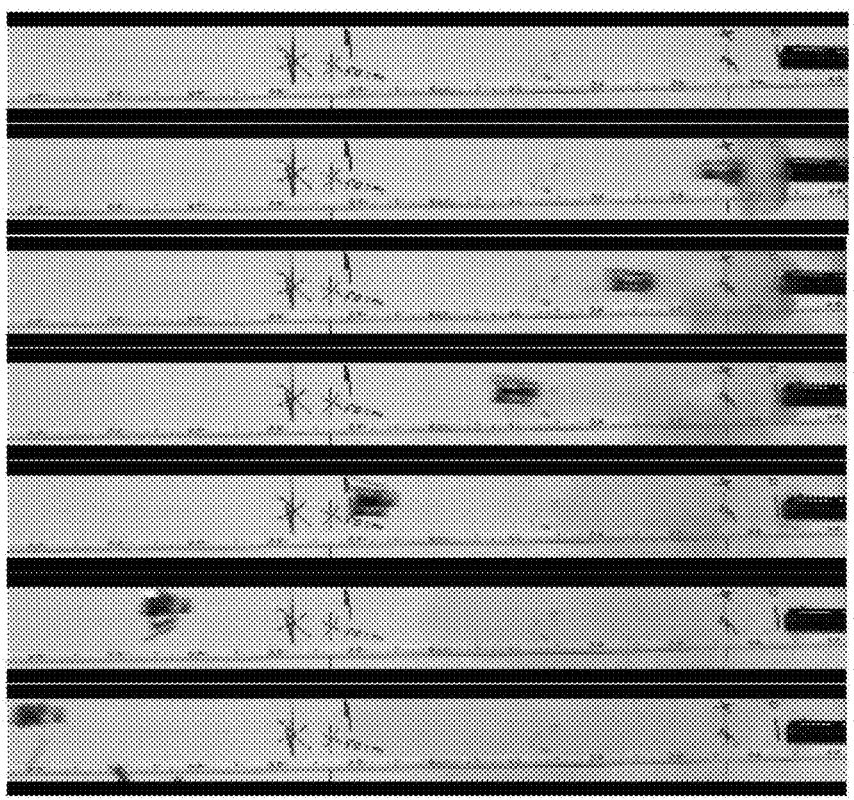
FIG. 6 shows a time series of photographic images taken with an Edgertronic high-speed camera at roughly 30,000 frames per second, showing images of a shotgun firing a shell loaded with a multi-component wad system including a gas sealing wad comprising PBSA. The series of images shows the shot and wads leaving the shotgun barrel just after the weapon is fired.

FIG. 6 shows a time series set of images from another such shot, showing the flash of the gun, the emergence of the shot and wad, and then the fragmentation of the shot pipe wad after leaving the barrel, in this case, with complete breaking up of the shot pipe wad occurring more than 50 cm downfield. FIG. 6 shows an intact PBSA gas seal and a PHA shot wad that breaks apart downfield.

Shot patterns were compared to a commercial 12 gauge, 1¼ ounce, #2 steel shot load using a test pattern at 40 yards, and fired from a shotgun equipped with an Improved Modified Choke. A significantly higher percentage of shots (88%) hit a 4 ft.×4 ft. target using the biodegradable ammunition described herein relative to the commercially available product, and a significantly higher percentage of shots (56%) fell within a central 30-inch diameter circle (the commercial product percentages were 75% and 41%, respectively). Gas seals stayed intact and were found downrange, while the shot pipe wad broke apart after exiting the barrel, and fragments thereof were found not as far downrange. No significant gas blowthrough was observed with any of the shots.

Example 3. Formulations of PBSA (made from BIONOLLE™ 3001 MD, available from Showa Denko K.K. in Tokyo, Japan) were utilized to form gas seals for 12 gauge shotguns. The PBSA gas seals were loaded into shells with powder, #2 steel shot (1⅜ ounces), and a shot pipe wad made from a polyhydroxy alkanoate polymer designed and formulated to fracture after leaving the shotgun barrel upon firing. Sufficient powder was used to generate an average velocity of 1514 fps, with 84% of the shots hitting a 48 inch square target at 40 yards, and 44% within a 30-inch diameter circle.

Example 4

Formulations of PBSA (made from BIONOLLE™ 3001 MD, available from Showa Denko K.K. in Tokyo, Japan) were utilized to form gas seals for 12 gauge shotguns. The PBSA gas seals were loaded into shells with powder, nine to eleven pellets of 00' shot, a shot pipe wad made from a PHA polymer designed and formulated to fracture after leaving the shotgun barrel upon firing, a filler wad, and optionally buffer (to fill in spaces between the shot) and optionally a cushion wad. Not surprisingly, shot patterns improved when using buffer, in this case, a buffer comprising PHA powder. The buffer can include any material including those disclosed herein. In some embodiments, the buffer degrades into environmentally benign components.

Example 5

Primed hulls were loaded with powder, a biodegradable powder wad of various compositions, a biodegradable shot pipe wad comprising PHA, and 1⅜ ounces of #2 steel shot, then crimped and sealant was applied. The loads were then fired from a shotgun equipped with either a full, modified, or improved cylinder choke. The powder wads were designed to be very short in height, thereby taking up a minimum amount of room in the shell to comfortably allow loading of increased amounts of powder and shot. After firing the rounds, the spent powder wads were recovered. In most cases, the wads had been compromised, with slight pinholes or cracks at the weakest point.

Surprisingly, loads with powder wads made from a compounded formulation comprising a 90:10 weight ratio of PBSA to PHA outperformed loads with powder wads made from a formulation in which PBSA was the only biodegradable polymer. In general, the area of cracking was smaller, the average velocity was higher, and a higher average pellet density within a 30-inch circle (40-yard target) was obtained for loads utilizing the powder wads made from a blended mixture of PBSA and PHA. Moreover, these wads form a PBSA/PHA blend may have enhanced degradability, particularly in salt water, relative to otherwise identical wads in which PBSA is the only biodegradable polymer.

Example 6

Figure 7:
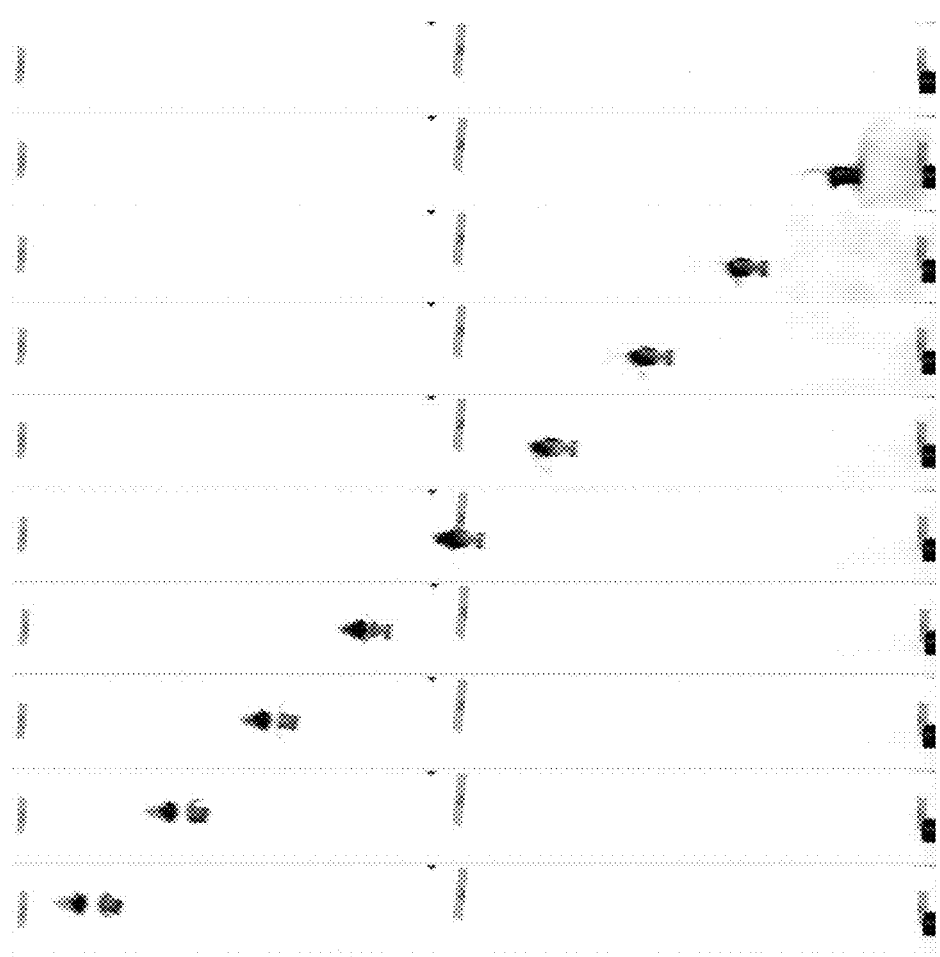
FIG. 7 shows a time series of photographic images taken with an Edgertronic high-speed camera at roughly 30,000 frames per second, showing images of a shotgun firing a shell loaded with a one-piece wad comprising PBSA, wherein the one-piece wad includes both a gas sealing component and a shot cup component. The series of images shows the shot and wad leaving the shotgun barrel just after the weapon is fired.

A primed hull (2¾") was sequentially loaded with powder, a one-piece PBSA wad, and steel shot. The one-piece PBSA wad included a gas sealing section (including a round flared portion that obturated upon firing of the shotgun to form a gas seal), a crush section, and a shot cup section. The shot cup portion of the wad contained petals that were designed to fold back upon exiting the barrel in order to release the shot. The recovered wad showed that the gas seal portion remained intact. High-speed video showed that the petals folded back as planned to release the shot. A time-series image is provided in FIG. 7, which shows a PBSA one-piece wad with petals folding back to release the shot.

Example 7

Primed 3-inch hulls were loaded with 2.2 grams powder, a biodegradable PBSA powder wad, a biodegradable shot wad formulated from PHA, and 1¼ ounces of #2 steel shot, then crimped. The loads were cooled to −16° C., 0° C., or kept at ambient temperature. Shot velocities were averaged over numerous shots, and no significant differences were observed in shot velocities based on shell temperatures. The number of shot pellets hitting within a 30-inch circle at a distance 25 yards from the end of the barrel was recorded. The average percentage of shot hitting within the 30-inch circle was 96% for shells cooled to 16° C. or 0° C., and 98% for shells maintained at ambient temperature (about 30° C.).

Example 8

Gas seals wads comprising PBSA, suitable as part of a multi-component wad system described in other examples, were injection molded and tested for biodegradability. The gas sealing wads were loaded into shells as described in other examples, and fired. The gas seals were collected, cleaned, and weighed, then placed in 250 micron mesh bags. The bags were tied shut using cable ties, and a lead weight was attached if the bag was to be submerged. The bags of wads were put in various locations around the Chesapeake Bay watershed in Virginia, including freshwater, brackish, and saltwater environments. The gas seal wads were tested after one month and again after roughly ten months to assess biodegradation by weight. To perform the testing, the wads were cleaned, dried in an oven, and weighed. No significant decomposition or weight loss was observed in the one-month tests. After waiting between 9 and 11 months, the powder wads were cleaned, dried, and weighed. The percentage weight loss at this time ranged from 2% to 6%, depending on the aquatic environment. This is consistent with a typically longer incubation period for microbial degradation for objects made from PBSA than, for example, PHA.

INCORPORATION BY REFERENCE

All publications, patents, and patent applications cited herein are hereby expressly incorporated by reference in their entirety and for all purposes to the same extent as if each was so individually denoted.

EQUIVALENTS

While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

The articles "a" and "an" are used herein to refer to one or to more than one (i.e. to at least one) of the grammatical object of the article. By way of example, "a wad" means one wad or more than one wad.

Any ranges cited herein are inclusive.

What is claimed is:

1. A shotgun shell comprising:
a shotgun hull having a boundary defining an enclosed space;
shot, powder, and a biodegradable wad confined within said enclosed space;
wherein said biodegradable wad separates said shot from said powder and provides a gas sealing function; and
wherein said biodegradable wad comprises at least 50% by weight of a polybutylene succinate adipate polymer.

2. The shotgun shell of claim 1, wherein said biodegradable wad comprises a biodegradable polymer, and wherein said biodegradable polymer comprises at least 80% by weight of a polybutylene succinate adipate polymer.

3. The shotgun shell of claim 1, wherein said biodegradable wad comprises at least two biodegradable polymers, wherein said first biodegradable polymer comprises a polybutylene succinate adipate polymer and wherein said second biodegradable polymer comprises a polyhydroxyalkanoate polymer.

4. The shotgun shell of claim 3, and wherein the concentration by weight of said first biodegradable polymer to said second biodegradable polymer in said biodegradable wad is greater than four to one.

5. The shotgun shell of claim 1, wherein said biodegradable wad is a one-piece wad.

6. The shotgun shell of claim 5, wherein said one-piece wad comprises a cup portion that contains said shot within said shotgun hull, and wherein said cup portion includes slits.

7. The shotgun shell of claim 5, wherein the one-piece wad is the only wad within the shotgun hull.

8. The shotgun shell of claim 1, wherein said biodegradable wad is a gas sealing wad.

9. The shotgun shell of claim 1, wherein said shotgun hull encloses the biodegradable wad and another wad.

10. The shotgun shell of claim 1, wherein the range of adipic acid co-monomer content is between 1% and 40%.

11. A method of shooting a shotgun shell comprising:
providing a shotgun shell having a boundary defining an enclosed space and powder, shot, and a biodegradable wad confined within said enclosed space, wherein said biodegradable wad physically separates said powder from said shot and provides a gas sealing function, wherein said biodegradable wad comprises at least 50% by weight of a polybutylene succinate adipate polymer;
whereby the shot and the biodegradable wad are configured to be launched out of a barrel of a shotgun to expose said biodegradable wad to a terrestrial or aquatic environment, wherein said biodegradable wad biodegrades.

12. The method of claim 11, wherein said biodegradable wad comprises at least two biodegradable polymers, wherein said first biodegradable polymer comprises a polybutylene succinate adipate polymer and wherein said second biodegradable polymer comprises a polyhydroxyalkanoate polymer.

13. The method of claim 12, and wherein the concentration by weight of said first biodegradable polymer to said second biodegradable polymer in said biodegradable wad is greater than four to one.

14. The method of claim 11, wherein said biodegradable wad is a one-piece wad.

15. The method of claim 14, wherein the one-piece wad is the only wad within the shotgun shell.

16. The method of claim 11, wherein said biodegradable wad is a gas sealing wad.

17. The method of claim 11, wherein said shotgun shell encloses the biodegradable wad and another wad.

18. A method of loading a shotgun shell comprising:
providing a shotshell hull;
providing powder;
providing shot;
providing a biodegradable wad, wherein said biodegradable wad comprises at least 50% by weight of a polybutylene succinate adipate polymer;
loading said powder, said biodegradable wad, and said shot into said shotgun hull; and
crimping said shotgun hull loaded with said powder, said biodegradable wad, and said shot; and
wherein said biodegradable wad physically separates said powder from said shot and provides a gas sealing function.

19. The method of claim 18, wherein said biodegradable polymer comprises at least 80% by weight of a polybutylene succinate adipate polymer.

20. The method of claim 18, further comprising sequentially loading said powder, said biodegradable wad, and said shot into said shotgun hull.

21. The method of claim 18, wherein said shotgun hull is a primed shotgun hull.

22. The method of claim 18, wherein said biodegradable wad comprises at least two biodegradable polymers, wherein said first biodegradable polymer comprises a polybutylene succinate adipate polymer, wherein said second biodegradable polymer comprises a polyhydroxyalkanoate polymer.

23. The method of claim 22, wherein the concentration by weight of said first biodegradable polymer to said second biodegradable polymer in said biodegradable wad is greater than four to one.

24. The method of claim 18, wherein said biodegradable wad is a one-piece wad.

25. The method of claim 24, wherein said one-piece wad comprises a cup portion that contains said shot within said shotgun hull, and wherein said cup portion includes slits.

26. The method of claim 18, wherein said shotgun hull encloses the biodegradable wad and another wad.

27. A biodegradable shotgun wad comprising polybutylene succinate adipate, wherein said biodegradable shotgun wad comprises a round component that is configured to obturate to form a gas seal within a barrel of a shotgun when said shotgun is fired, wherein said biodegradable shotgun wad comprises at least 50% by weight of a polybutylene succinate adipate polymer.

28. The biodegradable shotgun wad of claim 27, wherein said shotgun wad comprises a shot cup portion that is configured to contain shot within a shotgun shell.

29. The biodegradable shotgun wad of claim 27, wherein said biodegradable shotgun wad comprises at least two biodegradable polymers, wherein said first biodegradable polymer comprises a polybutylene succinate adipate polymer and wherein said second biodegradable polymer comprises a polyhydroxyalkanoate polymer.

30. The biodegradable shotgun wad of claim 29, wherein the concentration by weight of said first biodegradable polymer to said second biodegradable polymer in said biodegradable wad is greater than four to one.

* * * * *

UNITED STATES PATENT AND TRADEMARK OFFICE
CERTIFICATE OF CORRECTION

PATENT NO. : 10,393,486 B2  
APPLICATION NO. : 15/926452  
DATED : August 27, 2019  
INVENTOR(S) : Kirk J. Havens Page 1 of 1

It is certified that error appears in the above-identified patent and that said Letters Patent is hereby corrected as shown below:

In the Specification

In Column 10, Line 3, after "the" delete "this".

In Column 13, Line 51, delete "PHBSHV)." and insert --PHB5HV).--, therefor.

Signed and Sealed this  
Third Day of March, 2020

Andrei Iancu  
*Director of the United States Patent and Trademark Office*